(12) United States Patent
Crolley (10) Patent No.: US 8,015,064 B2
(45) Date of Patent: Sep. 6, 2011

(54) SYSTEM AND METHOD OF PROVIDING ADVERTISEMENTS TO CELLULAR DEVICES

(75) Inventor: C. Wayne Crolley, Bryant, AR (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1232 days.

(21) Appl. No.: 11/110,970

(22) Filed: Apr. 20, 2005

(65) Prior Publication Data

US 2006/0240808 A1     Oct. 26, 2006

(51) Int. Cl.
*H04M 3/42* (2006.01)

(52) U.S. Cl. ............... 705/14.69; 705/14.62; 705/14.57; 705/14.58

(58) Field of Classification Search ............ 705/14, 705/10, 14.4, 14.57, 14.58, 14.69, 14.62; 455/414.1, 456.1, 404.1, 404.2
See application file for complete search history.

(56) References Cited

U.S. PATENT DOCUMENTS

| | | | |
|---|---|---|---|
| 5,214,793 A | | 5/1993 | Conway et al. |
| 5,235,633 A | * | 8/1993 | Dennison et al. .......... 455/456.3 |
| 5,295,180 A | * | 3/1994 | Vendetti et al. ............ 455/456.2 |
| 5,523,950 A | | 6/1996 | Peterson |
| 5,627,549 A | | 5/1997 | Park |
| 5,797,097 A | * | 8/1998 | Roach et al. ............... 455/456.2 |
| 5,903,816 A | | 5/1999 | Broadwin et al. |
| 5,943,653 A | | 8/1999 | Ross et al. |
| 5,999,525 A | | 12/1999 | Krishnaswamy et al. |
| 6,178,411 B1 | | 1/2001 | Reiter |
| 6,253,146 B1 | | 6/2001 | Hanson et al. |
| 6,269,361 B1 | | 7/2001 | Davis et al. |
| 6,275,989 B1 | | 8/2001 | Broadwin et al. |
| 6,332,127 B1 | | 12/2001 | Bandera |
| 6,335,927 B1 | | 1/2002 | Elliott et al. |
| 6,363,250 B1 | * | 3/2002 | Lindell ...................... 455/422.1 |
| 6,381,534 B2 | * | 4/2002 | Takayama et al. ............ 701/201 |
| 6,405,364 B1 | | 6/2002 | Bowman-Amuah |
| 6,422,464 B1 | | 7/2002 | Terranova |

(Continued)

FOREIGN PATENT DOCUMENTS

EP    1 115 077 A2    7/2001
EP    1 202 203 A3    10/2003

OTHER PUBLICATIONS

Wikipedia, Point of Interest, Oct. 24, 2008, Wikipedia, 3 pgs.*

(Continued)

*Primary Examiner* — John G Weiss
*Assistant Examiner* — Adam Chornesky
(74) *Attorney, Agent, or Firm* — Toler Law Group (57) ABSTRACT

A method of advertising is disclosed and includes monitoring transmission data of one or more cellular towers located along a freeway and recording an identification and a time and date stamp for one or more cellular devices that establish communication via the one or more cellular towers as the at least one cellular device travels within a user vehicle along the freeway. Further, the method includes determining one or more types of media files that are supported by the cellular device and monitoring the movement of the one or more cellular devices along the freeway. The method also includes transmitting one or more advertisements to the at least one cellular device when the cellular device is within a predetermined range of a freeway exit. The one or more advertisement is transmitted in a format of the one or more types of media files supported by the cellular device.

22 Claims, 6 Drawing Sheets

U.S. PATENT DOCUMENTS

| | | |
|---|---|---|
| 6,516,192 B1 | 2/2003 | Spaur et al. |
| 6,522,875 B1 | 2/2003 | Dowling et al. |
| 6,526,275 B1 | 2/2003 | Calvert |
| 6,570,851 B1 | 5/2003 | Koskelainen et al. |
| 6,647,269 B2 | 11/2003 | Hendrey et al. |
| 6,731,625 B1 | 5/2004 | Eastep et al. |
| 6,795,700 B2 | 9/2004 | Karaoguz et al. |
| 6,823,257 B2 | 11/2004 | Clapper |
| 6,842,620 B2 * | 1/2005 | Smith et al. ................ 455/456.1 |
| 6,845,091 B2 | 1/2005 | Ogier et al. |
| 6,847,822 B1 * | 1/2005 | Dennison et al. .......... 455/456.1 |
| 6,859,722 B2 | 2/2005 | Jones |
| 6,912,230 B1 * | 6/2005 | Salkini et al. ................ 370/466 |
| 6,941,574 B1 | 9/2005 | Broadwin et al. |
| 6,944,447 B2 | 9/2005 | Portman et al. |
| 6,993,326 B2 | 1/2006 | Link et al. |
| 7,006,881 B1 | 2/2006 | Hoffberg et al. |
| 7,023,818 B1 | 4/2006 | Elliott |
| 7,099,936 B2 | 8/2006 | Chase et al. |
| 7,103,368 B2 | 9/2006 | Teshima |
| 7,110,880 B2 * | 9/2006 | Breed et al. .................... 701/207 |
| 7,120,235 B2 | 10/2006 | Altberg et al. |
| 7,127,261 B2 | 10/2006 | Van Erlach |
| 7,130,807 B1 | 10/2006 | Mikurak |
| 7,162,365 B2 | 1/2007 | Clapper |
| 7,176,813 B2 * | 2/2007 | Kawamata et al. ...... 340/995.13 |
| 7,289,531 B2 | 10/2007 | Van Den Bosch et al. |
| 7,290,046 B1 | 10/2007 | Kumar |
| 7,305,240 B2 | 12/2007 | Chou et al. |
| 7,308,414 B2 | 12/2007 | Parker et al. |
| 7,343,317 B2 * | 3/2008 | Jokinen et al. .................. 705/14 |
| 7,367,042 B1 | 4/2008 | Dakss et al. |
| 7,369,856 B2 | 5/2008 | Ovadia |
| 7,418,252 B2 * | 8/2008 | Erskine et al. ................. 455/405 |
| 7,418,402 B2 | 8/2008 | McCrossin et al. |
| 7,421,454 B2 | 9/2008 | DeShan et al. |
| 7,439,878 B2 * | 10/2008 | Kato et al. ..................... 340/988 |
| 7,516,086 B2 | 4/2009 | Chu et al. |
| 7,778,873 B2 | 8/2010 | Crolley |
| 2001/0044751 A1 | 11/2001 | Pugliese et al. |
| 2002/0022476 A1 * | 2/2002 | Go ................................ 455/414 |
| 2002/0032035 A1 | 3/2002 | Teshima |
| 2002/0037716 A1 * | 3/2002 | McKenna et al. ............. 455/422 |
| 2002/0046084 A1 * | 4/2002 | Steele et al. ..................... 705/14 |
| 2002/0049640 A1 | 4/2002 | Sheriff et al. |
| 2002/0087505 A1 * | 7/2002 | Smith et al. ........................ 707/1 |
| 2002/0119788 A1 | 8/2002 | Parupudi et al. |
| 2002/0147634 A1 | 10/2002 | Jacoby et al. |
| 2002/0147645 A1 * | 10/2002 | Alao et al. ....................... 705/14 |
| 2002/0161598 A1 | 10/2002 | Kim |
| 2002/0161646 A1 | 10/2002 | Gailey et al. |
| 2002/0184089 A1 * | 12/2002 | Tsou et al. ....................... 705/14 |
| 2003/0036848 A1 | 2/2003 | Sheha et al. |
| 2003/0046158 A1 | 3/2003 | Kratky |
| 2003/0046420 A1 | 3/2003 | Breiter et al. |
| 2003/0054844 A1 | 3/2003 | Anvekar et al. |
| 2003/0065805 A1 | 4/2003 | Barnes, Jr. |
| 2003/0070167 A1 | 4/2003 | Holtz et al. |
| 2003/0074207 A1 * | 4/2003 | Pace et al. ......................... 705/1 |
| 2003/0134648 A1 * | 7/2003 | Reed et al. .................... 455/456 |
| 2003/0154126 A1 | 8/2003 | Gehlot et al. |
| 2003/0195808 A1 | 10/2003 | Brown et al. |
| 2003/0200299 A1 | 10/2003 | Jamison, III |
| 2003/0208754 A1 | 11/2003 | Sridhar et al. |
| 2003/0216960 A1 | 11/2003 | Postrel |
| 2003/0220835 A1 | 11/2003 | Barnes, Jr. |
| 2004/0002896 A1 | 1/2004 | Alanen et al. |
| 2004/0015824 A1 | 1/2004 | Felkey et al. |
| 2004/0036622 A1 | 2/2004 | Dukach et al. |
| 2004/0054589 A1 | 3/2004 | Nicholas et al. |
| 2004/0076279 A1 | 4/2004 | Taschereau |
| 2004/0122735 A1 | 6/2004 | Meshkin |
| 2004/0143842 A1 * | 7/2004 | Joshi ................................ 725/32 |
| 2004/0186766 A1 * | 9/2004 | Fellenstein et al. ............. 705/14 |
| 2004/0186769 A1 * | 9/2004 | Mangold et al. ................ 705/14 |
| 2004/0192351 A1 | 9/2004 | Duncan |
| 2004/0203712 A1 * | 10/2004 | Murai et al. ................. 455/422.1 |
| 2004/0215559 A1 | 10/2004 | Rebenack et al. |
| 2004/0220881 A1 * | 11/2004 | Powell ............................. 705/59 |
| 2004/0225564 A1 | 11/2004 | Walsh et al. |
| 2004/0225746 A1 | 11/2004 | Niell et al. |
| 2004/0260470 A1 * | 12/2004 | Rast ............................... 701/300 |
| 2004/0267617 A1 | 12/2004 | Yanase |
| 2005/0009499 A1 * | 1/2005 | Koster ........................... 455/406 |
| 2005/0021401 A1 | 1/2005 | Postrel |
| 2005/0027590 A9 | 2/2005 | Gailey et al. |
| 2005/0027591 A9 | 2/2005 | Gailey et al. |
| 2005/0027594 A1 | 2/2005 | Yasnovsky et al. |
| 2005/0030907 A1 * | 2/2005 | Lou et al. ...................... 370/254 |
| 2005/0055431 A1 | 3/2005 | Jones et al. |
| 2005/0065844 A1 | 3/2005 | Raj et al. |
| 2005/0075093 A1 | 4/2005 | Lei et al. |
| 2005/0079878 A1 * | 4/2005 | Smith et al. ................. 455/456.5 |
| 2005/0102180 A1 | 5/2005 | Gailey et al. |
| 2005/0107066 A1 * | 5/2005 | Erskine et al. ................ 455/405 |
| 2005/0144243 A1 * | 6/2005 | Cheng ........................... 709/206 |
| 2005/0154996 A1 | 7/2005 | Othmer |
| 2005/0209861 A1 | 9/2005 | Hewes et al. |
| 2005/0221843 A1 | 10/2005 | Friedman et al. |
| 2005/0227700 A1 | 10/2005 | Kirkland et al. |
| 2005/0239448 A1 | 10/2005 | Bayne |
| 2005/0239495 A1 | 10/2005 | Bayne |
| 2005/0289590 A1 * | 12/2005 | Cheok et al. .................... 725/37 |
| 2006/0020548 A1 * | 1/2006 | Flather ............................. 705/51 |
| 2006/0026067 A1 | 2/2006 | Nicholas et al. |
| 2006/0036548 A1 | 2/2006 | Roever et al. |
| 2006/0059511 A1 * | 3/2006 | Nocifera et al. ................ 725/32 |
| 2006/0074764 A1 * | 4/2006 | Schmitt et al. .................. 705/26 |
| 2006/0087979 A1 | 4/2006 | Schine et al. |
| 2006/0092931 A1 | 5/2006 | Walter et al. |
| 2006/0106850 A1 | 5/2006 | Morgan et al. |
| 2006/0111967 A1 * | 5/2006 | Forbes ............................. 705/14 |
| 2006/0116507 A1 * | 6/2006 | Oppermann et al. ......... 530/840 |
| 2006/0167784 A1 | 7/2006 | Hoffberg |
| 2006/0173745 A1 | 8/2006 | Disterdick |
| 2006/0178932 A1 | 8/2006 | Lang |
| 2006/0184640 A1 | 8/2006 | Hatch |
| 2006/0200381 A1 * | 9/2006 | Elkholy et al. .................. 705/14 |
| 2006/0211437 A1 * | 9/2006 | Yang ............................. 455/518 |
| 2006/0239254 A1 | 10/2006 | Short et al. |
| 2006/0240608 A1 * | 10/2006 | Crolley ....................... 455/414.1 |
| 2006/0242009 A1 | 10/2006 | Crolley |
| 2006/0242010 A1 | 10/2006 | Crolley |
| 2006/0253291 A1 | 11/2006 | Ishigai et al. |
| 2007/0013548 A1 * | 1/2007 | Sendrowicz ............. 340/870.02 |
| 2007/0027839 A1 | 2/2007 | Ives |
| 2007/0061205 A1 | 3/2007 | Crolley |
| 2007/0094698 A1 | 4/2007 | Bountour et al. |
| 2007/0208864 A1 | 9/2007 | Flynn et al. |
| 2007/0287473 A1 * | 12/2007 | Dupray ....................... 455/456.1 |
| 2008/0010372 A1 | 1/2008 | Khedouri et al. |
| 2008/0033805 A1 | 2/2008 | Padin |
| 2008/0076432 A1 | 3/2008 | Senarath et al. |
| 2008/0097858 A1 * | 4/2008 | Vucina et al. .................... 705/14 |
| 2008/0109317 A1 | 5/2008 | Singh |
| 2008/0139217 A1 | 6/2008 | Alizadeh-Shabdiz et al. |

OTHER PUBLICATIONS

Notice of Allowance dated Oct. 18, 2010; U.S. Appl. No. 11/110,938, filed Apr. 20, 2005; 26 pages.

Non-Final Office Action dated Oct. 17, 2008 (U.S. Appl. No. 11/517,026), 18 pp.

Final Office Action date Mar. 30, 2009 (U.S. Appl. No. 11/517,026), 22 pp.

Non-Final Office Action dated Aug. 5, 2009 (U.S. Appl. No. 11/517,026), 26 pp.

Final Office Action date Mar. 10, 2010 (U.S. Appl. No. 11/517,026), 33 pp.

Non-Final Office Action dated Apr. 14, 2008 (U.S. Appl. No. 11/110,938), 16 pp.

Non-Final Office Action dated Oct. 28, 2008 (U.S. Appl. No. 11/110,938), 23 pp.

Final Office Action date Apr. 7, 2009 (U.S. Appl. No. 11/110,938), 30 pp.

Non-Final Office Action date Sep. 1, 2009 (U.S. Appl. No. 11/110,938), 29 pp.

Non-Final Office Action date Apr. 21, 2008 (U.S. Appl. No. 11/110,980), 13 pp.

Non-Final Office Action date Nov. 18, 2008 (U.S. Appl. No. 11/110,980), 30 pp.

Final Office Action date Apr. 27, 2009 (U.S. Appl. No. 11/110,980), 36 pp.

Non-Final Office Action date Oct. 2, 2009 (U.S. Appl. No. 11/110,980), 28 pp.

* cited by examiner

SYSTEM AND METHOD OF PROVIDING ADVERTISEMENTS TO CELLULAR DEVICES

FIELD OF THE DISCLOSURE

The present disclosure relates to wireless communication and providing advertisements to cellular devices.

BACKGROUND

Cellular devices, e.g., cellular telephones, portable digital assistants, and 802.11 devices, are very useful for obtaining information while traveling. For example, a user can call an information service to obtain the location of a gas station, restaurant, etc. Further, a user can access the Internet via a Wi-Fi device and input a query in order to obtain information about a business, a local attraction, a civic event, or any other point of interest. These systems are not proactive and require an input from a user before information about a business, location, etc. is sent to the requesting device. Additionally, GPS systems have been provided that can track the location of a user and show the location of the user on an electronic map. However, these systems include limited information and typically, the electronic map provided by the GPS system is simply a map with little other information, e.g., information about the hours of operation of a particular business or point of interest. Further, with the proliferation of various different cellular devices and media requirements it is difficult to distribute an advertisement in a single format.

Accordingly, there is a need for an improved system and method of providing advertisements to cellular devices.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A method of advertising is disclosed and includes monitoring transmission data of one or more cellular towers located along a freeway and recording an identification and a time and date stamp for one or more cellular devices that establish communication via the one or more cellular towers as the at least one cellular device travels within a user vehicle along the freeway. Further, the method includes determining one or more types of media files that are supported by the cellular device and monitoring the movement of the one or more cellular devices along the freeway. The method also includes transmitting one or more advertisements to the at least one cellular device when the cellular device is within a predetermined range of a freeway exit. The one or more advertisement is transmitted in a format of the one or more types of media files supported by the cellular device.

In a particular embodiment, the method includes polling the one or more cellular devices in order to determine the one or more types of media files supported. In an alternative embodiment, the method includes querying a database in order to determine the one or more types of media files supported by the one or more cellular devices. The database can be queried with a user identification associated with the one or more cellular devices. The database can also be queried with a make and model identification associated with the one or more cellular devices.

In another particular embodiment, the movement of the one or more cellular device is monitor based on a plurality of recorded time and date stamps associated with the cellular device. Further, in a particular embodiment, the method includes monitoring transmitted advertisements and cellular devices to which advertisements were transmitted. Additionally, the method includes generating a billing report and generating a usage report based on the transmitted advertisements and cellular devices to which advertisements were transmitted. The method further includes charging an advertising customer based on the transmitted advertisements and a service level agreement.

In another embodiment, a method of transmitting information to a cellular device is disclosed and includes receiving and storing user route information, receiving and storing a user selection of one or more points of interest along user defined route, and receiving and storing a user cellular telephone number associated with the cellular device. Further, in this embodiment, the method includes receiving and storing one or more types of media files that are supported by the cellular device and receiving and storing an approximate time and date of departure. Additionally, the method includes locating a user cellular device within a cellular region associated with the departure address.

In still another embodiment, a system is disclosed and includes at least one cellular tower that is deployed along a freeway. Moreover, the system includes a database that stores one or more media files associated with one or more advertisements. The database also stores information concerning the types of media files supported by one or more cellular devices. In this embodiment, the system further includes a server that is coupled to the database. The server has access to the at least one cellular tower and includes a processor, a computer readable medium that is accessible to the processor, and a computer program that is embedded within the computer readable medium. The computer program includes instructions to monitor transmission data of one or more cellular towers located along a freeway, instructions to record an identification and a time and date stamp for one or more cellular devices that establish communication via the one or more cellular towers as the at least one cellular device travels within a user vehicle along the freeway, and instructions to determine one or more types of media files that are supported by the cellular device. Moreover, the computer program includes instructions to monitor the movement of the one or more cellular devices along the freeway and instructions to transmit one or more advertisements to the at least one cellular device when the cellular device is within a predetermined range of a freeway exit. The one or more advertisement transmitted in a format of the one or more types of media files supported by the cellular device.

In yet another embodiment, a server is disclosed and includes a processor, a computer readable medium that is accessible to the processor, and a computer program that is embedded within the computer readable medium. The computer program includes instructions to determine one or more types of media files that are supported by a cellular device in communication with a cellular network and instructions to transmit one or more advertisements to the at least one cellular device as the cellular device moves along a freeway within a vehicle. The one or more advertisements are transmitted in a format of the one or more types of media files supported by the cellular device.

Figure 1:
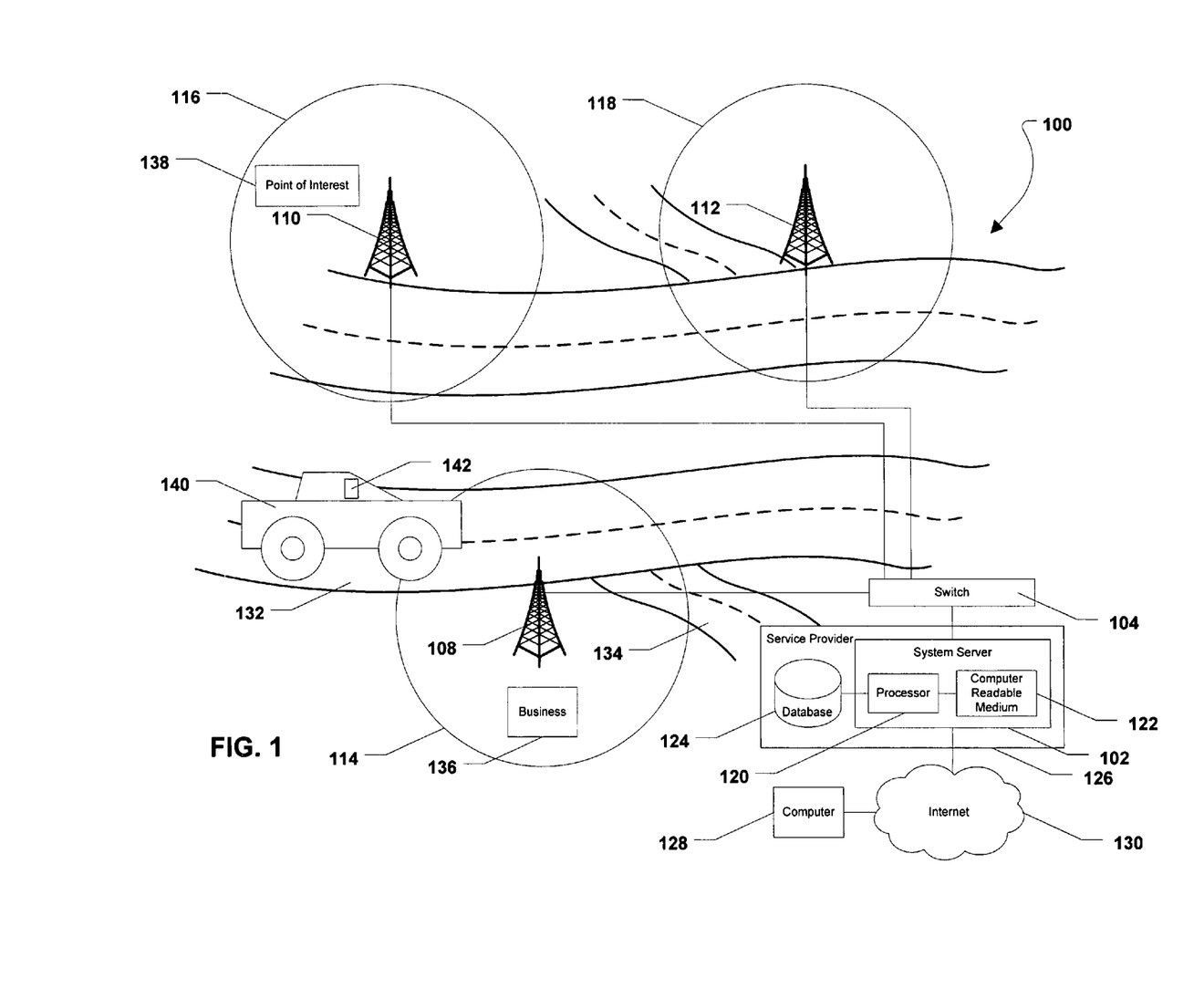
FIG. 1 is a block diagram representative of a wireless communication system over which one or more advertisements can be transmitted.

Referring initially to FIG. 1, a system of advertising to cellular devices is shown and is generally designated 100. As shown, the system 100 includes a system server 102 that is coupled to a router/switch 104. The router/switch 104, in turn, is coupled to a first cellular tower 108, a second cellular tower 110, and a third cellular tower 112. Further, each cellular tower 108, 110, 112 provides a separate coverage area 114, 116, 118 for the system 100.

As depicted in FIG. 1, the system server 102 includes a processor 120 and a computer readable medium 122 that is accessible to the processor 120. A database 124 is also coupled to the system server 102. In a particular embodiment, the database 124 includes user information, e.g., the identifications of subscriber devices. Further, the database 124 can include a plurality of advertisements associated with one or more businesses or points of interest within the coverage areas 114, 116, 118 provided by the system 100 shown in FIG. 1.

In a particular embodiment, the database 124 can store multiple advertisements in multiple formats for a particular advertising customer. As such, when the system server 102 determines that a particular cellular device does not support a particular media file for an advertisement, e.g., a video file, the system server 102 can transmit another media file for that advertisement, e.g., a still image file. As shown in FIG. 1, the system server 102, the processor 120, the computer readable medium 122, and the database 124 can be co-located at a service provider 126.

FIG. 1 further shows that a computer 128 can be coupled to the system server 102 via the Internet 130. A system manager or some other person, e.g., a subscriber, can communicate with the system server 102 using the computer 128. As illustrated in FIG. 1, the cellular towers 108, 112, 114 may be deployed so that the coverage areas 114, 116, 118 provided by the cellular towers overlap a freeway 132. In a particular embodiment, the freeway 132 can be any type of roadway used to carry public transportation, e.g., one or more vehicles 140. Also, the freeway 132 can include at least one freeway exit 134 that provides access to one or more business 136. A cellular tower 108 can be deployed so that it is adjacent to, or proximal to, the freeway exit 134. Further, a cellular tower 110 may be deployed so that it is adjacent to, or proximal to, a point of interest 138.

In a particular embodiment, the system server 102 can include a computer program embedded within the computer readable medium 122. The computer program can include logic to execute a method that allows the system server 102 to monitor the movement of a cellular device 142 within the vehicle 140. As the vehicle 140 and the cellular device 142 approach the freeway exit 134, one or more advertisements associated with the business 136 that is accessible via the freeway exit can be automatically transmitted to the cellular device 142. Information such as other services available via the freeway exit 134 can also be provided. Further, as the vehicle 140 and the cellular device 142 approach the point of interest 138, information related to the point of interest 138 can be automatically transmitted to the cellular device 142.

As described in detail below, other information, including traffic alerts, can be transmitted to the cellular device 142.

Figure 2:
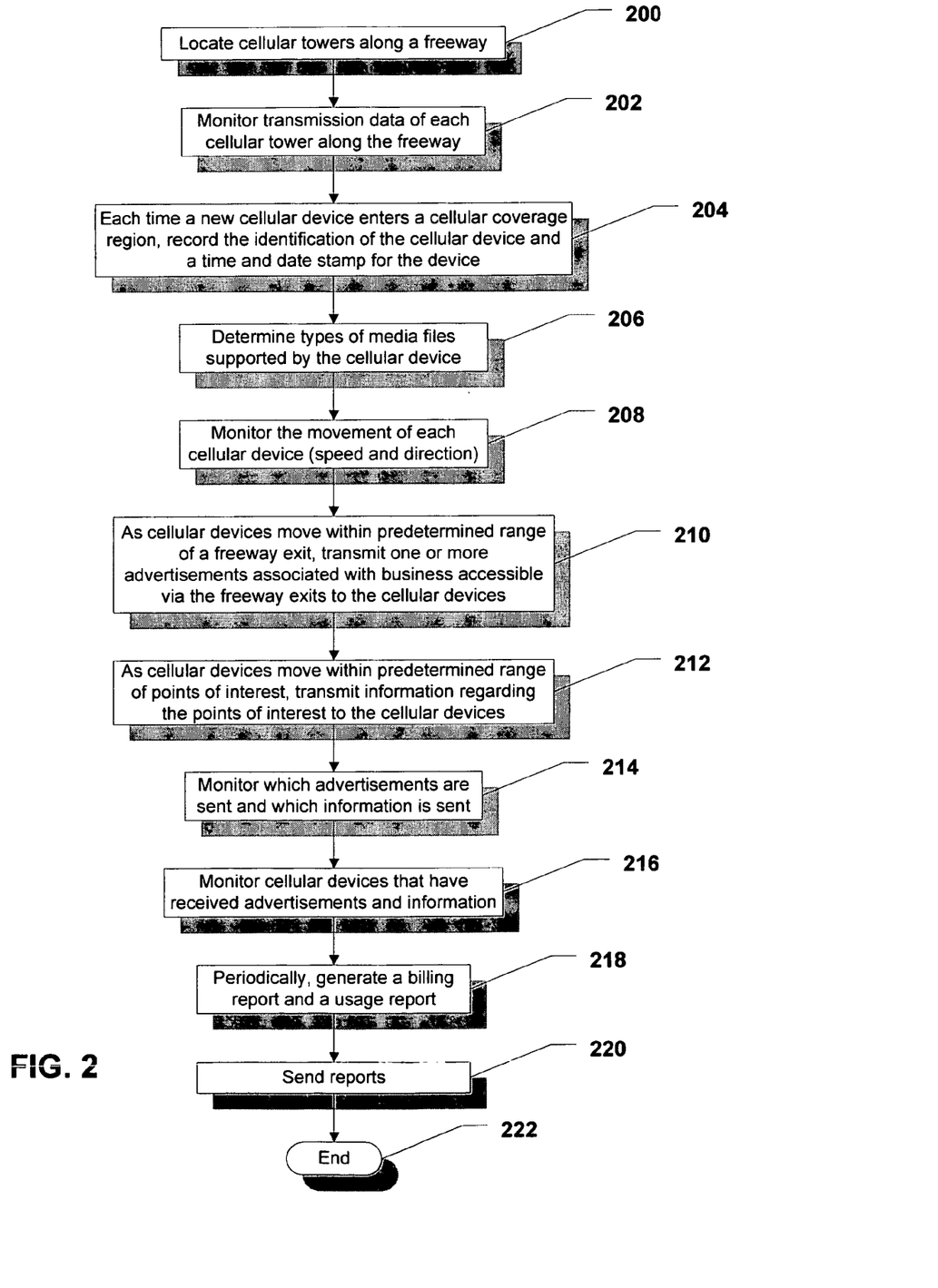
FIG. 2 is a flow chart to illustrate a method of transmitting advertisements to one or more cellular devices.

Referring to FIG. 2, a method of transmitting advertisements to cellular devices is shown and commences at block 200. At block 200, a system server locates one or more cellular towers along a freeway. Next, at block 202, the system server monitors the transmission data of each cellular tower along the freeway. Moving to block 204, each time a new cellular device enters a cellular coverage region, the system server records an identification of the cellular device and a time and date stamp for the cellular device. At block 206, the system server determines the types of media files that are supported by the cellular device.

In an illustrative embodiment, the media files supported by the cellular device can be audio data files, video data files, still image data files, etc. Particularly, the still image data files can be joint photographic experts group (JPEG) data files, graphics interchange format (GIF) data files, tagged image data file format (TIFF) data files, Adobe Photoshop (PSD) data files, portable networks graphics (PNG) data files, windows metadata file (WMF) data files, or any other types of image data files that can be downloaded to and viewed at the cellular device.

Further, the video data files can be moving picture experts group (MPEG) data files, audio video interleave (AVI) data files, Windows media video (WMV) data files, advanced streaming format (ASF) data files, Quicktime (MOV) data files, Real Media (RM) data files, or any other type of video data files that can be downloaded to and viewed at cellular device.

In a particular embodiment, the audio data files can be MPEG audio layer three (MP3) data files, waveform audio format (WAV) data files, windows media audio (WMA) data files, OGG data files, Monkey's Audio digital data files (APE) data file, VOX data files, Real Audio (RA) data files, synthetic music mobile application format (MMF) data files, musical instrument digital interface (MID) data files, phrase format (SPF) data files, Qualcomm PureVoice audio data files (QCP) or any other sound data files that can be listened to at the cellular device. In an illustrative embodiment, real-time voice and video can be transmitted using the real-time protocol (RTP) and the video datagram protocol (VDP).

In a particular embodiment, the server can retrieve the information concerning the media files supported by a particular device from a database by querying the database with a user identification or an identification associated with the cellular device. The information can also be retrieved by querying the database with a device make and model identification. Further, in an alternative embodiment, the server can poll the device in order to make this determination.

Moving to block 208, the system server monitors the movement of each cellular device, e.g., the speed of movement, direction of movement, and current location. In a particular embodiment, the system server monitors the movement of each cellular device by tracking a series of time and date stamps with each cellular tower for each cellular device. At block 210, as cellular devices move within predetermined range of one or more freeway exits, the system server transmits one or more advertisements associated with business accessible via the freeway exits to the cellular devices.

In a particular embodiment, the server first retrieves each advertisement from a database coupled to the server and then, the server transmits the advertisements. Also, in a particular embodiment, the system server can transmit advertisements for businesses that subscribe to an advertising service and agree to a service level agreement. The service level agreement can provide four tiers of service, e.g., a first service tier provides for text message advertisements, a second service tier for still graphical advertisements, a third service tier for streaming video and audio advertisements, and a four service for real-time voice and video advertisements.

Moving to block 212, as cellular devices move within a predetermined range of one or more points of interest, the system server can transmit advertisements or other information regarding the one or more points of interest to the cellular devices. In an illustrative embodiment, the point of interest can be a museum, a monument, a lake, or any other point of interest. Further, the information can include hours of operation, directions, contact information, discounts, interesting facts, etc. The information can be treated as advertisements and can be transmitted based the four service tiers, described above.

At block 214, the system server monitor which advertisements are sent and which information is sent. Also, at block 216, the system server monitors which cellular devices received advertisements and information from the system server. Proceeding to block 218, the system server periodically generates a billing report and a usage report for each advertising customer based on the information obtained above during step 216. In a particular embodiment, the system server generates a billing report and a usage report for each advertising customer one a month. Moving to block 220, the system server sends each advertising customer the corresponding billing report and usage report. In a particular embodiment, the reports can be transmitted electronically. In the alternative, hard copies of the reports can be generated and sent via the mail. The method then ends at state 222.

In a particular embodiment, advertising customers can be charged based on a service level agreement. For example, a fourth service tier advertisement may be the most expensive advertisement and the first service tier advertisement may be the least expensive advertisement. Since the server polls a cellular device to determine a supported media type before sending an advertisement, advertisements are delivered in the supported format to be received and viewed at the cellular device. Further, an advertising customer is charged for those advertisements that can be viewed at the device. In other words, an advertising customer may select a fourth service tier, but the advertising customer may only be charged for fourth service tier advertisements when real-time voice and video can be received and viewed at a particular cellular device.

In a particular embodiment, since the server records the time and date before transmitting advertisements, advertisements that are associated with a particular business may not be sent if the business is closed. Further, by monitoring the movement of a cellular device while it is in communication with a network as it travels within a user vehicle along a freeway, advertisements can be sent for a business when the cellular device enters a cellular coverage region that includes the exit by which the business can be accessed. In an alternative embodiment, the server can begin transmitting advertisements one or cellular regions before the cellular region that includes the exit by which the business can be accessed. An advertisement customer can pay extra to have the server send advertisements to cellular devices before the cellular device actually enters the cellular coverage region that includes the exit by which the business can be accessed. For example, the greater the number of cellular regions before the cellular region that includes the exit associated with the business, the greater the advertising customer may be charged.

Figure 3:
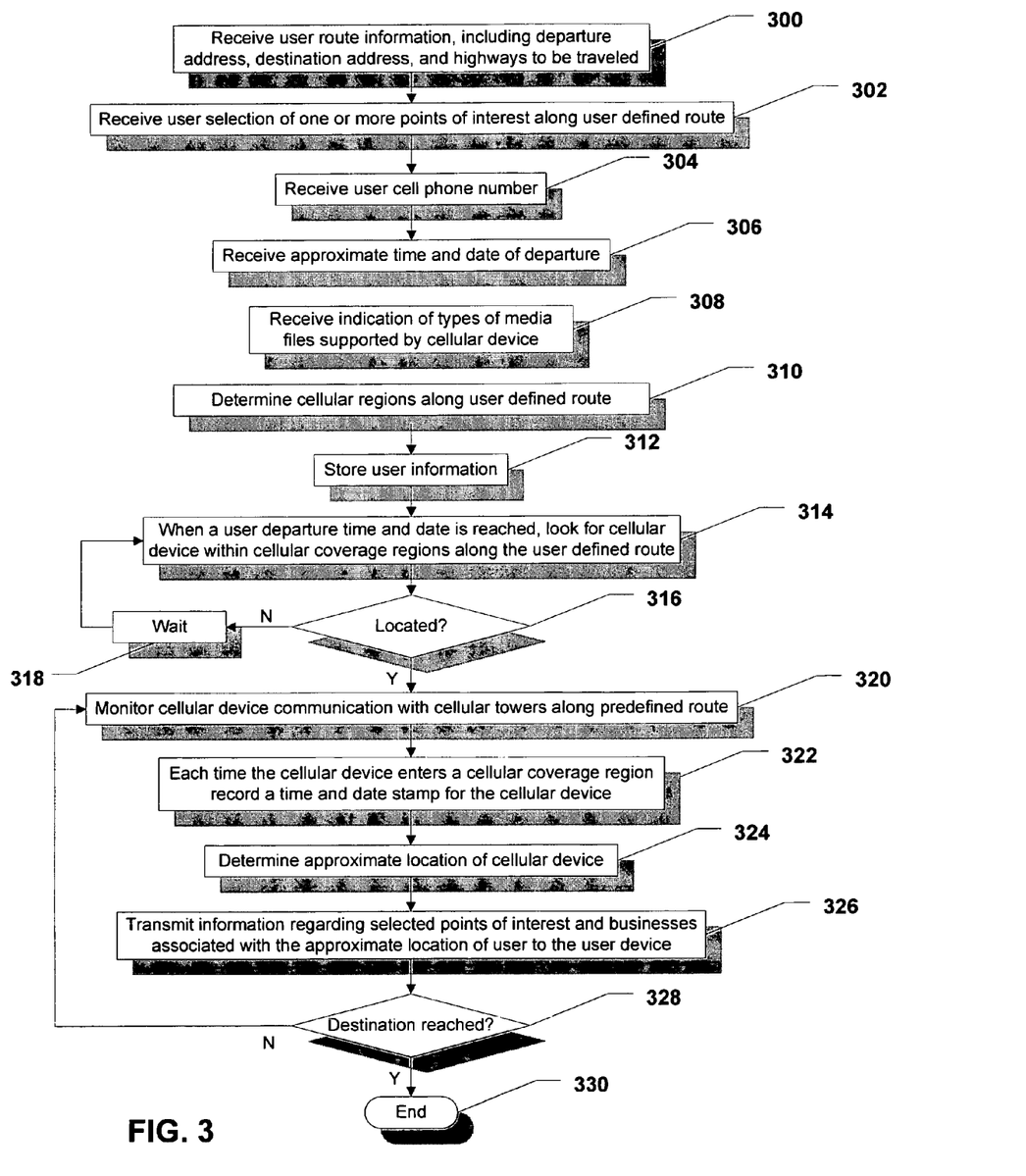
FIG. 3 is a flow chart to illustrate an alternative method of transmitting advertisements to one or more cellular devices.

FIG. 3 depicts an alternative method of providing advertisements to cellular devices. Beginning at block 300, the system server receives user route information about an upcoming road trip from a cellular device or a computer via the Internet. In an exemplary, non-limiting embodiment, the information can include a departure address, a destination address, and the freeways to be traveled. At block 302, the system server can receive a user selection of one or more points of interest along the user defined route. Moving to block 304, the system server receives a user cell phone number. Next, at block 306, the system server receives an approximate time and date of departure from the user. At block 308, the system server receives an indication of the types of media files that are supported by the cellular device.

Continuing to block 310, the system server determines the cellular telephone service regions along the user defined route. At block 312, the system server stores the user information in a database. The user information includes the route information, the user selected points of interest, the user cell phone number, the approximate time and date of departure, and the cellular telephone regions along the user defined route. Next, at block 314, when the user departure time and date is reached, the system server attempts to locate the user cellular device within the cellular coverage regions along the user defined route. In a particular embodiment, the system server first attempts to locate the user cellular device within a cellular coverage region associated with the user departure address.

Proceeding to decision step 316, the system server determines whether the user cellular device has been located. If not, the method proceeds to block 318 and the system server waits a predetermined time period. The method then returns to block 314 and continues as described herein. On the other hand, at decision step 316, if the user cellular device is located, the method continues to block 320 and the system server monitors the user cellular device communication with cellular towers along the user defined route, e.g., by monitoring the transmission data of each cellular tower along the user defined route. At block 322, each time the cellular device moves into a cellular coverage region, the system server notes the cellular coverage region and records a time and date stamp for the cellular device.

Moving to block 324, the system server determines an approximate location of the user cellular device. In a particular embodiment, the system server determines the approximate location of the user cellular device based on the cellular coverage region associated with the most recent time and date stamp for the cellular device. At block 326, the system server transmits information and advertisements to the user device. In a particular embodiment, the information and advertisements are related to selected businesses and points of interest associated with the approximate location of the user. Next, at decision step 328, the system server determines whether the user defined destination has been reached. If the destination has not been reached, the method returns to block 320 and continues as described herein. On the other hand, when the destination is reached, the method ends at state 330.

Figure 4:
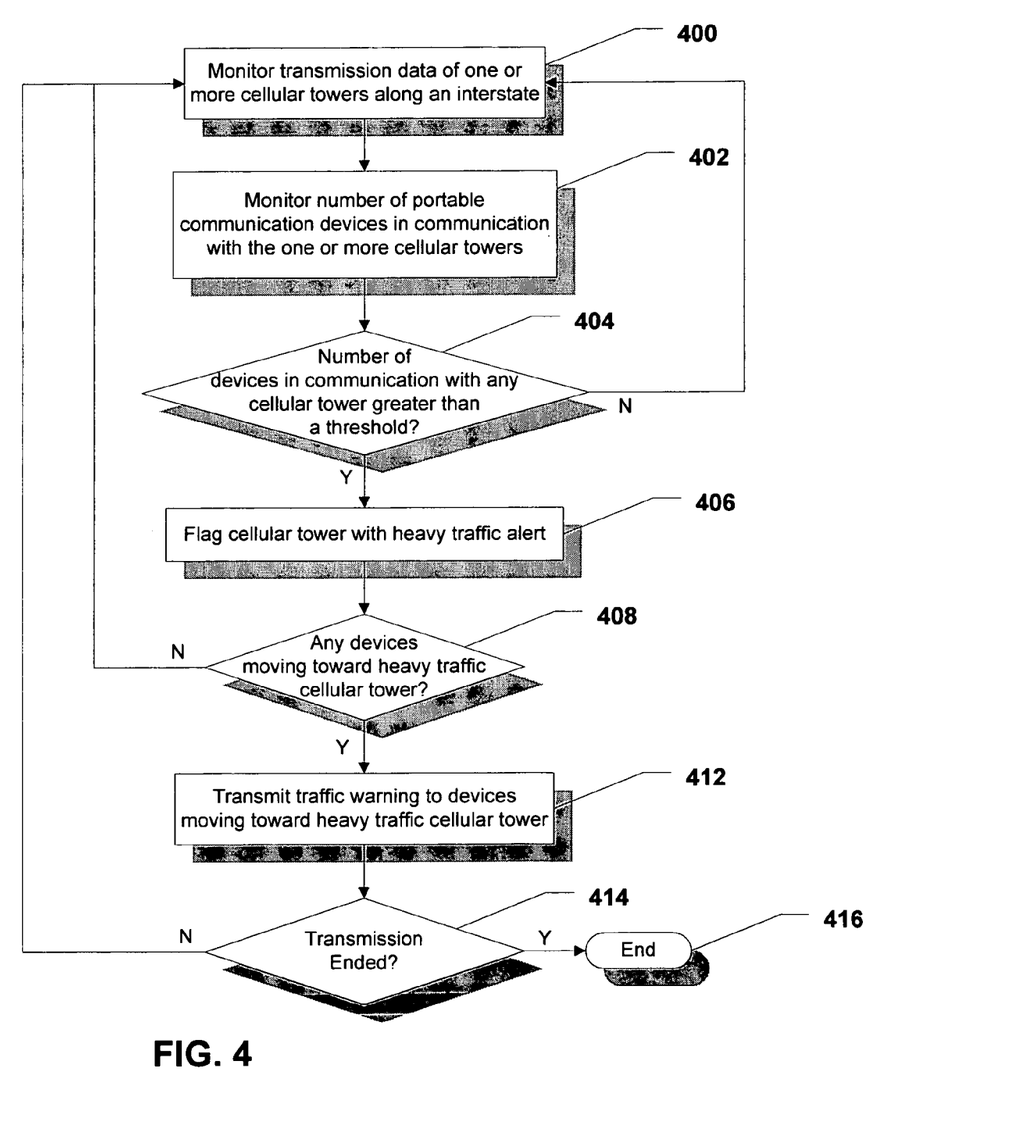
FIG. 4 is a flow chart to illustrate a method of transmitting traffic warnings to one or more cellular devices.

Referring now to FIG. 4, a method of transmitting traffic warnings to one or more cellular devices is shown and commences at block 400. At block 400, the system server monitors transmission data of one or more cellular towers along a freeway. Next, at block 402, the system server monitors a number of cellular devices in communication with each of the one or more cellular towers. Proceeding to block 404, the system server determines whether a number of cellular devices in communication with any cellular tower is greater than a predetermined threshold. If not, the method returns to block 400 and continues as described herein. Conversely, when the number of cellular devices in communication with any cellular is greater than the threshold, the method moves to block 406 and the system server flags the cellular tower with a heavy traffic alert.

Continuing to decision step 408, the system server determines whether any cellular devices are moving toward the cellular tower with the heavy traffic alert. If not, the method returns to block 400 and continues as described herein. On the other hand, the method moves to block 412 and the system server transmits a traffic warning to the cellular devices that are moving toward the cellular tower with the traffic alert. Next, at decision step 414, the system server determines whether all communication with the cellular towers along the freeway has ended. If so, the method ends at state 416. Otherwise, the method returns to block 400 and continues as described herein.

Figure 5:
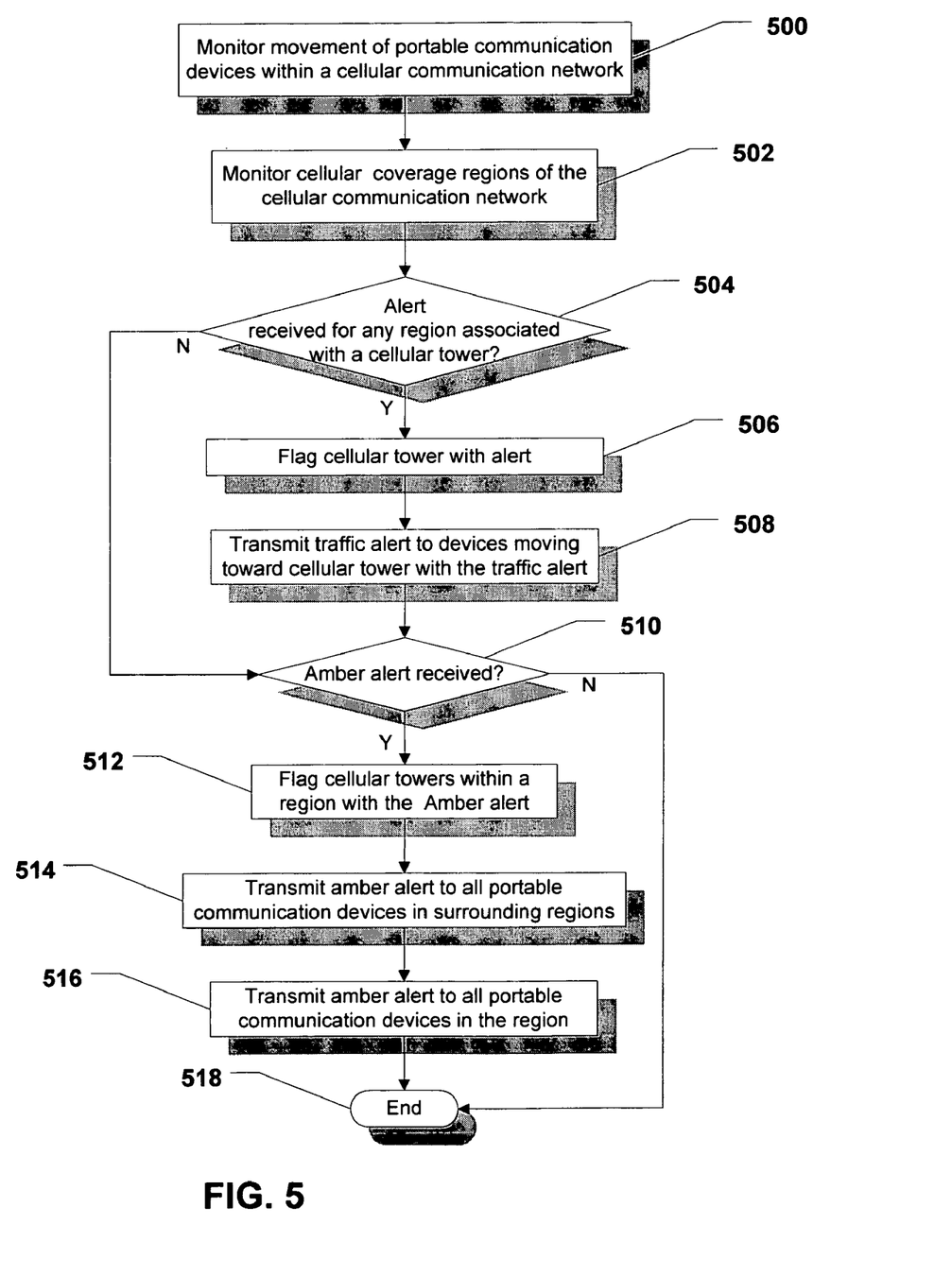
FIG. 5 is a flow chart to illustrate an alternative method of transmitting traffic warnings to one or more cellular devices.

FIG. 5 illustrates an alternative method of transmitting traffic warnings to one or more cellular devices. Commencing at block 500, a system server monitors the movement of one or more cellular devices within a cellular communication network by monitoring a plurality of time and date stamps for each cellular device. At block 502, the system server monitors one or more cellular coverage regions of the cellular communication network. Proceeding to block 504, the system server determines whether an alert is received for any region in which a cellular tower is installed. In a particular embodiment, the alert can be a traffic alert, a lane closure alert, a weather alert, a road condition alert, or any other alert related to traffic or driving conditions. At block 506, the system server flags each cellular tower within the region with the alert.

Continuing to block 508, the system server transmits the alert to the cellular devices that are moving toward the cellular tower that is flagged with the alert. Next, at decision diamond 510, the system server determines whether an Amber alert is received for any region along the freeway. If so, the method proceeds to block 512 and the system server flags each cellular tower within that region with the Amber alert. Next, at block 514, the system server transmits the Amber alert to each cellular device that is in communication with the cellular towers that are flagged with the Amber alert. At block 516, the system server also transmits the Amber alert to each cellular device in communication with cellular towers in the regions surrounding the region that originally received the Amber alert. The method then ends at state 518.

Figure 6:
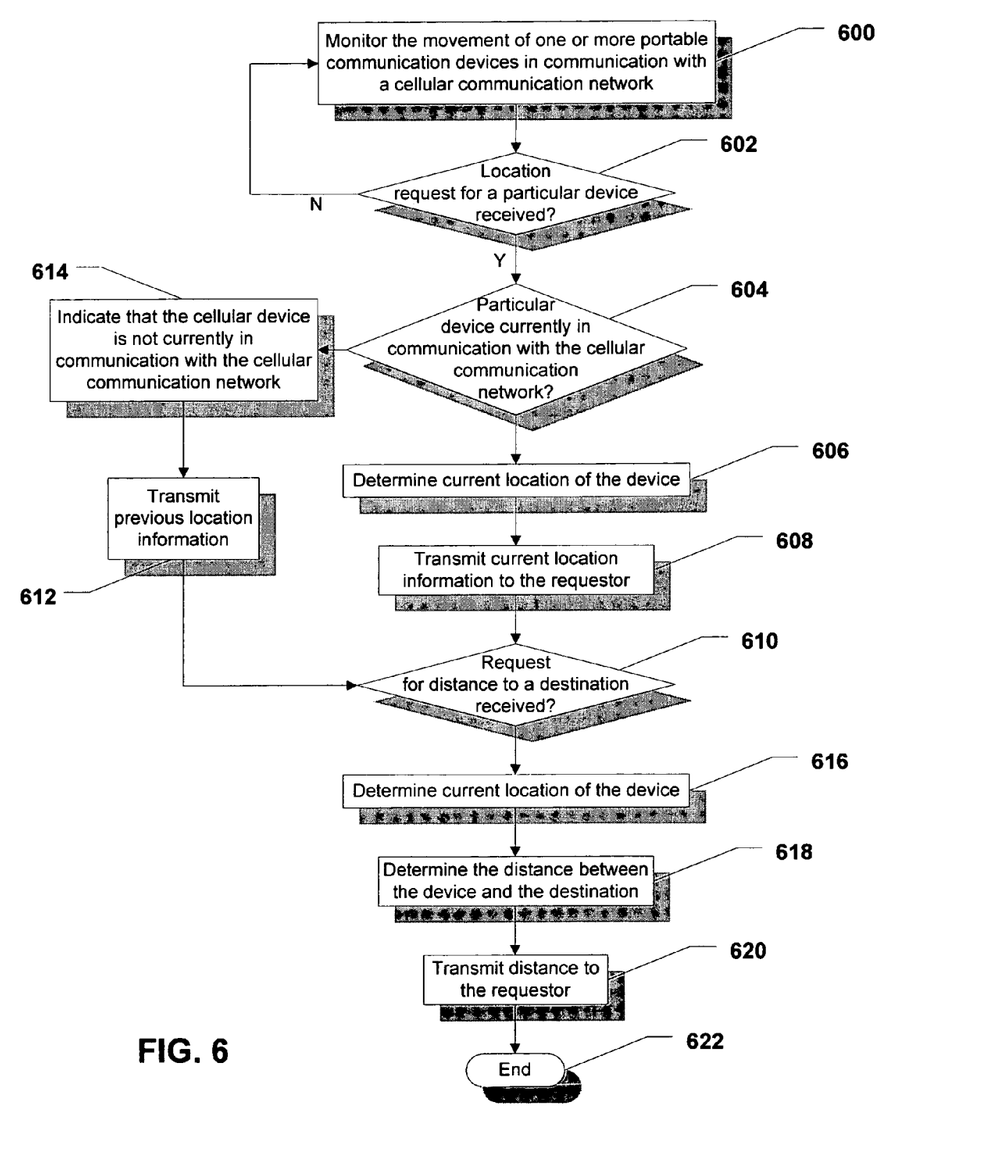
FIG. 6 is a flow chart to illustrate a method of transmitting information related to the location of a cellular device.

Referring now to FIG. 6, a method of transmitting information related to the location of a cellular device is shown and commences at block 600. At block 600, the system server monitors the movement of one or more cellular devices in communication with the cellular communication network. Next, at decision step 602, the server determines whether a location request for a particular cellular device is received. In a particular embodiment, the request is sent from another user, e.g., a family member, via a computer that is connected to the system server via the Internet. However, the request can be received from the actual cellular device that is the subject of the location request.

At decision step 602, if a location request is not received, the method returns to block 600 and continues as described herein. Conversely, if a location request is received for a particular cellular device, the method proceeds to decision step 604. At decision step 604, the system server determines whether the particular cellular device is currently in communication with the network. If so, the system server determines the current location of the device, at block 606, and transmits the current location information to the requestor, at block 608. The method then continues to decision step 610.

Returning to decision step 604, if the particular cellular device that is the subject of the location request is not currently in communication with the network, the method moves to block 612 and the server indicates that the cellular device is not currently in communication with the network. At block 614, the server transmits the previous location information for the cellular device to the requester. The method then proceeds to decision step 610.

At decision step 610, the server determines whether a request for distance to a destination is received for a particular cellular device. The request for the distance can be received from the particular cellular device that is the subject of the distance request or from another device such as a computer coupled to the Internet. If a request for distance is received for a particular cellular device, the method proceeds to block 616, and the server determines the current location of the cellular device. Thereafter, at block 618, the server determines the distance between the cellular device and the destination. Continuing to block 620, the server transmits the distance to the requester. The method then ends at state 622.

Returning to decision step 610, if a request for distance to a destination is not received, the method continues to block 624 and the server indicates that the device is not currently in communication with the network. The method then ends at state 622.

With the configuration of structure described above, the system and method of providing advertisements to cellular devices expands the potential market available via traditional advertising by including the various cellular devices that are in constant use. Further, other information can be proactively sent to cellular devices. That information can include weather alerts, traffic alerts, road condition alerts, Amber alerts, etc. Also, the system can be used to deliver movies on demand via the network provided.

Other information may be sent to the cellular devices. For example, membership alerts may be sent to members of certain groups, e.g., the American Automobile Association (AAA). Also, healthcare information, such as hospital locations, may be sent to individuals with health concerns traveling in unfamiliar areas. Additionally, certain advertisements may be broadcast to all devices in communication with the network. On the other hand, certain advertisements may be unicast to particular cellular devices, e.g., to existing customers of a particular business.

In an alternative embodiment, searches can be initiated from a cellular device. A search can be initiated using a voice command, a text message, transmitting a picture to the network, swiping a credit card at a cellular device (e.g., to locate a particular gas station), passing a Bluetooth device near a Bluetooth enabled cellular device, etc.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of advertising, the method comprising:
monitoring transmission data of a cellular tower located along a roadway of a route;
receiving a user selection of one or more points of interest along the roadway in addition to an end destination;
recording an identification and a time and date stamp associated with a cellular device each time the cellular device moves into a cellular coverage region of the cellular tower as the cellular device travels along the roadway;

determining one or more types of media files that are supported by the cellular device;

monitoring the movement of the cellular device along the roadway by determining an approximate location of the cellular device based on a cellular coverage region associated with a most recent recorded date and time stamp of the cellular device;

transmitting one or more advertisements related to a particular point of interest of the user selection of one or more points of interest when the cellular device is within a predetermined range of a roadway exit for the particular point of interest, the one or more advertisements transmitted in a format of the one or more types of media files that have been determined to be supported by the cellular device; and generating one or more billing reports associating an advertising cost with the one or more advertisements, wherein the advertising cost associated with the one or more advertisements is determined based on a distance between the cellular device and the roadway exit.

2. The method of claim 1, further comprising polling the cellular device in order to determine the one or more types of media files supported by the cellular device.

3. The method of claim 1, querying a database in order to determine the one or more types of media files supported by the cellular device.

4. The method of claim 3, wherein the database is queried with a user identification associated with the cellular device.

5. The method of claim 4, wherein the database is queried with a make and model identification associated with the cellular device.

6. The method of claim 1, further comprising monitoring the one or more transmitted advertisements.

7. The method of claim 6, further comprising generating a billing report and generating a usage report based on the one or more transmitted advertisements.

8. The method of claim 7, further comprising sending an advertising customer associated with the one or more advertisements an advertising customer billing report and an advertising customer usage report charging an advertising customer based on the one or more transmitted advertisements.

9. The method of claim 1, further comprising transmitting information other than the one or more advertisements related to the particular point of interest to the cellular device when the cellular device is within a predetermined range of the particular point of interest.

10. The method of claim 1, wherein the one or more advertisements transmitted includes a still image file.

11. The method of claim 1, wherein the one or more advertisements transmitted includes a video file.

12. The method of claim 1, further comprising refraining from transmitting the one or more advertisements during a time period that the particular point of interest is closed.

13. A method of transmitting information to a cellular device, the method comprising:

receiving and storing user route planning information that includes a route;

receiving and storing a user selection of one or more points of interest along the route in addition to an end destination;

receiving and storing a user cellular telephone number associated with the cellular device;

receiving and storing one or more types of media files that are supported by the cellular device;

monitoring a cellular device communication with one or more cellular towers along the route;

recording a time and date stamp each time the cellular device moves into a cellular coverage region of a particular cellular tower of the one or more the cellular towers;

determining an approximate location of the cellular device based on the cellular coverage region associated with a most recent time and date stamp associated with the cellular device;

transmitting information to the cellular device about a particular point of interest from the user selection of one or more points of interest when the cellular device is in a predetermined range of the particular point of interest; and generating at least one billing report related to a cost of the information of at least one party associated with the particular point of interest, wherein the cost of the information is determined based on a distance between the cellular device and the particular point of interest and wherein the cost of the information is billed to a party associated with the particular point of interest.

14. The method of claim 13, further comprising transmitting an advertisement to the cellular device, wherein the advertisement is in a format of one of the one or more types of media files that are supported by the cellular device.

15. The method of claim 14, wherein the format is a video format.

16. The method of claim 14, wherein the format is an audio data file format.

17. A system comprising:

a database storing one or more media files associated with one or more advertisements, the database storing information specifying one or more types of media files supported by a cellular device;

a server coupled to the database and having access to a cellular tower, the server comprising:

a processor;

a computer readable medium accessible to the processor; and a computer program embedded within the computer readable medium and executable by the processor, the computer program comprising:

instructions to monitor transmission data of the cellular tower;

instructions to record an identification and a time and date stamp associated with the cellular device each time the cellular device moves into a cellular coverage region of the cellular tower as the cellular device travels;

instructions to determine one or more types of media files that are supported by the cellular device;

instructions to monitor movement of the cellular device by determining an approximate location of the cellular device based on a cellular coverage region associated with a most recent recorded date and time stamp of the cellular device;

instructions to transmit an advertisement related to a user selected point of interest to the cellular device when the cellular device is within a predetermined range of the user selected point of interest, the advertisement transmitted in a format of the one or more types of media files that have been determined to be supported by the cellular device; and instructions to generate a billing report associating an advertising cost with the advertisement, wherein the advertising cost associated with the advertisement is determined based on a distance between the cellular device and the point of interest.

18. The system of claim 17, wherein the database stores the advertisement in multiple formats associated with multiple media files.

19. The system of claim 17, wherein the computer program further comprises instructions to poll the cellular device in order to determine the one or more types of media files supported by the cellular device.

20. The system of claim 17, wherein the computer program further comprises instructions to query a database in order to determine the one or more types of media files supported by the cellular device.

21. The system of claim 17, wherein the cellular device supports a video format and the advertisement is transmitted as a video file in the video format.

22. The system of claim 21, wherein the video format is a moving picture experts group (MPEG) data file.

* * * * *